(12) United States Patent
Walker et al.

(10) Patent No.: US 7,377,098 B2
(45) Date of Patent: May 27, 2008

(54) GAS TURBINE ENGINE FRAME WITH AN INTEGRAL FLUID RESERVOIR AND AIR/FLUID HEAT EXCHANGER

(75) Inventors: Herbert L. Walker, Hartford, CT (US); Stevan W. Akerley, Durham, CT (US)

(73) Assignee: United Technologies Corporation, Hartford, CT (US)

( * ) Notice: Subject to any disclaimer, the term of this patent is extended or adjusted under 35 U.S.C. 154(b) by 631 days.

(21) Appl. No.: 10/926,552

(22) Filed: Aug. 26, 2004

(65) Prior Publication Data

US 2006/0042223 A1    Mar. 2, 2006

(51) Int. Cl.
*F02C 7/06* (2006.01)
*F02C 7/12* (2006.01)

(52) U.S. Cl. ............... 60/39.08; 60/39.83; 184/6.11

(58) Field of Classification Search ............... 60/39.08, 60/39.83, 226.1; 184/6.11
See application file for complete search history.

(56) References Cited

U.S. PATENT DOCUMENTS 3,779,345 A * 12/1973 Barnes et al. ............... 60/39.08
4,887,424 A * 12/1989 Geidel et al. ............... 60/39.08

* cited by examiner

*Primary Examiner*—L. J. Casaregola
(74) *Attorney, Agent, or Firm*—Colin L. Cini

(57) ABSTRACT

Disclosed is a structural frame for a gas turbine engine comprising an integral fluid reservoir and air/fluid heat exchanger. A central hub includes a reservoir for storing a fluid and an outer rim circumscribes the hub. A heat exchanger is fluidly coupled to the reservoir and is in simultaneous communication with the fluid and an air stream.

14 Claims, 8 Drawing Sheets

GAS TURBINE ENGINE FRAME WITH AN INTEGRAL FLUID RESERVOIR AND AIR/FLUID HEAT EXCHANGER

BACKGROUND OF THE INVENTION (1) Field of the Invention

The invention relates to gas turbine engine components, and more particularly to a structural frame comprising an integral fluid reservoir and air/fluid heat exchanger.

(2) Description of the Related Art

In axial-flow gas turbine engines, incoming air is pressurized in a forward compressor section and directed axially rearward through a diffuser to a combustion chamber. In the combustion chamber, fuel is injected into the pressurized air and the resulting fuel/air mixture is burned. Hot combustion gases expand into a rearward turbine section, where energy is extracted, before exiting the gas turbine engine as an exhaust jet.

The turbine section is comprised of alternating axial stages of rotating blades and stationary vanes. The turbine blades transfer the extracted energy to one or more rotor assemblies, which are coupled to the aft ends of one or more central shafts. The shafts extend axially forward and are similarly coupled to one or more compressor rotor assemblies at their fore ends. The shafts are concentric and are supported by bearings mounted within sealed compartments in one or more structural frames of the gas turbine engine.

Pressurized oil is used to lubricate the bearings and to remove heat generated during normal engine operation. The hot oil is directed from the bearing compartments to an oil storage tank and an air/oil heat exchanger before being directed back to the bearings. In most engine configurations, the oil tank is mounted externally to a structural frame surrounding the forward most stage of the compressor, referred to as a fan stage. In other engine configurations, the oil tank is mounted beneath the engine, adjacent to a gearbox. The air/oil heat exchanger uses air from the fan stage to absorb heat from the oil and is also externally mounted. A valve modulates the compressor air to ensure the oil temperature remains within a suitable operating range under all conditions.

In the event of a fan blade or other rotating component failure, it may be possible for an externally mounted oil tank or air/oil heat exchanger to be ruptured by debris. Also, externally mounted oil tanks and air/oil heat exchangers consume a vast amount of space, complicating maintenance of other components. The oil tank, air/oil heat exchanger and associated mounting brackets increase an engine's weight, which reduces the payload carrying capacity and fuel efficiency of an aircraft.

Since aircraft safety is critically important to the aviation industry and the traveling public, any improvement to the safety of a gas turbine engine is desirous. What are needed are an oil tank and air/fluid heat exchanger that are protected in the event of a fan blade or other rotating component failure. Relocation of these critical components from an externally mounted location to a less exposed location will also simplify maintenance and reduce engine weight.

BRIEF SUMMARY OF THE INVENTION

Provided is a structural frame with an integral reservoir for storing a fluid and air/fluid heat exchanger for removing heat from the fluid.

In accordance with an embodiment of the present invention, there is provided a structural frame disposed within an air stream. A central hub forms the reservoir for storing the fluid and an outer rim circumscribes the hub. A strut spans radially between the hub and the rim and one or more passages are fluidly coupled to the reservoir. Inlet and outlet ports may be located in the rim and may be fluidly coupled to a passage. An air/fluid heat exchanger is fluidly coupled to a passage and transfers heat from the fluid to the air stream.

Integrating a fluid reservoir and an air/fluid heat exchanger with a structural frame greatly reduces the risk of rupture due to a fan blade or other rotating component failure. The relocation of components from the external portion of the gas turbine engine also simplifies maintenance and reduces engine weight. Other features and advantages will be apparent from the following more detailed descriptions, taken in conjunction with the accompanying drawings, which illustrate by way of example several embodiments of a structural frame.

BRIEF DESCRIPTION OF THE SEVERAL VIEWS OF THE DRAWINGS

When referring to the drawings, like reference numerals designate identical or corresponding parts throughout the several views.

DETAILED DESCRIPTION OF THE INVENTION

Figure 1:
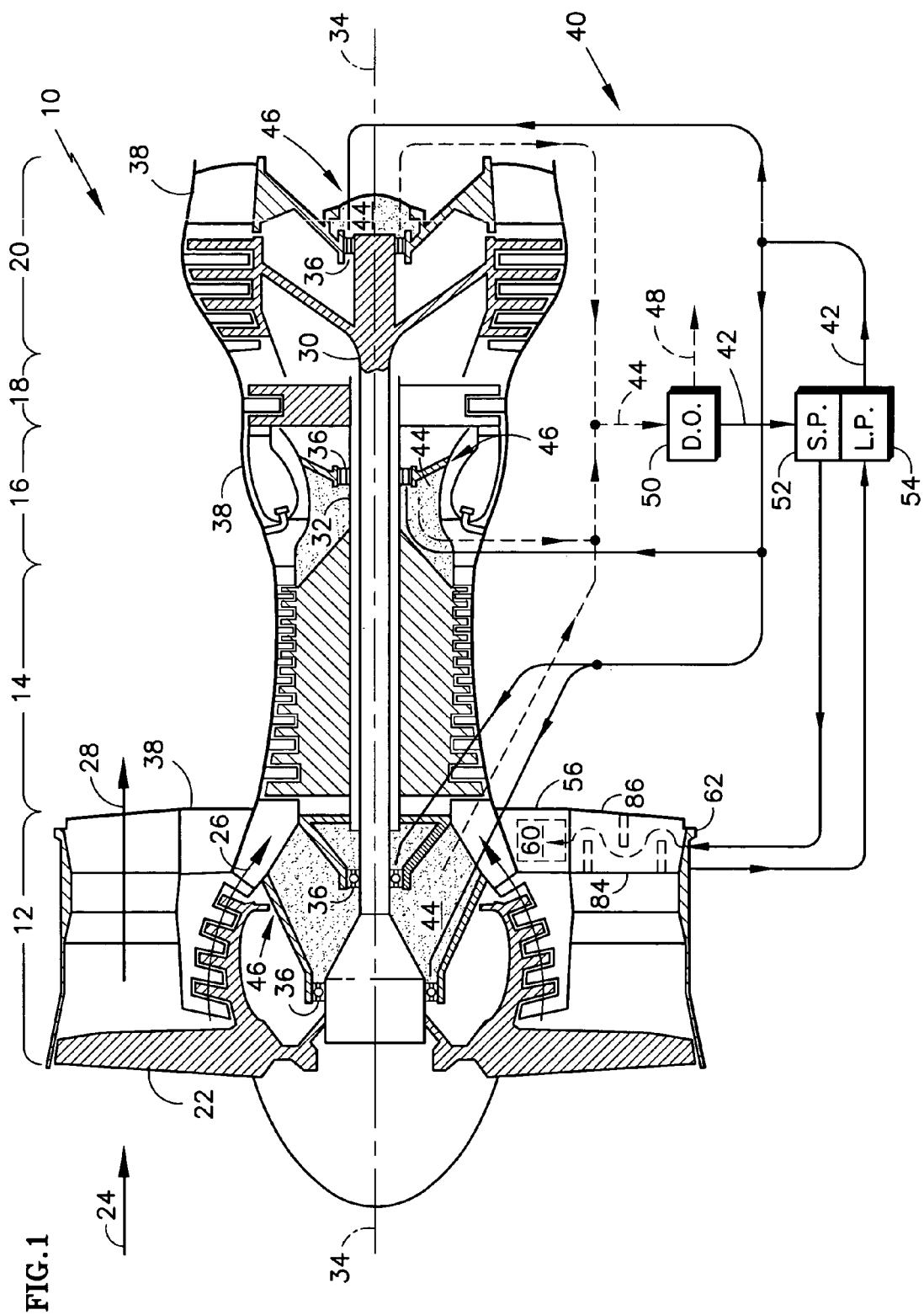
FIG. 1 is a simplified schematic sectional view of a gas turbine engine and lubrication system along a central, longitudinal axis.

The major sections of a gas turbine engine 10 of FIG. 1 are a low pressure compressor 12, a high pressure compressor 14, a combustor 16, a high pressure turbine 18 and a low pressure turbine 20. The forward most stage of the low pressure compressor 12, normally referred to as a fan stage 22, directs incoming air 24 into two portions: core air 26 and bypass air 28. The core air 26 is directed inside the aforementioned sections and the bypass air 28 is directed outside of the aforementioned sections. The low pressure compressor 12 is coupled to the low pressure turbine 20 by a low rotor shaft 30 and the high pressure compressor 14 is coupled to the high pressure turbine 18 by a high rotor shaft 32. The shafts 30, 32 are concentric and rotate about a central longitudinal axis 34 of the gas turbine engine 10.

The shafts 30, 32 are supported by bearings 36 from one or more structural frames 38 that are stationary. In the example shown, three structural frames 38 support the shafts 30, 32, however any number may be used. A lubrication system 40 manages the delivery of oil 42 to and from the bearings 36 to reduce friction and to remove excess heat. After the oil 42 has been delivered to the bearings 36, an air/oil mist 44 from one or more bearing compartments 46, is separated into oil 42 and buffer air 48 by a deoiler 50. The buffer air 48 is released from the gas turbine engine 10 and the oil 42 is delivered to a scavenge pump 52. The scavenge pump 52 delivers the oil 42 to a structural frame 38 for storage and cooling. After the oil 42 has been stored and cooled, it is delivered back to the bearings 36 by a lubrication pump 54 to begin the lubrication cycle anew.

Figure 2:
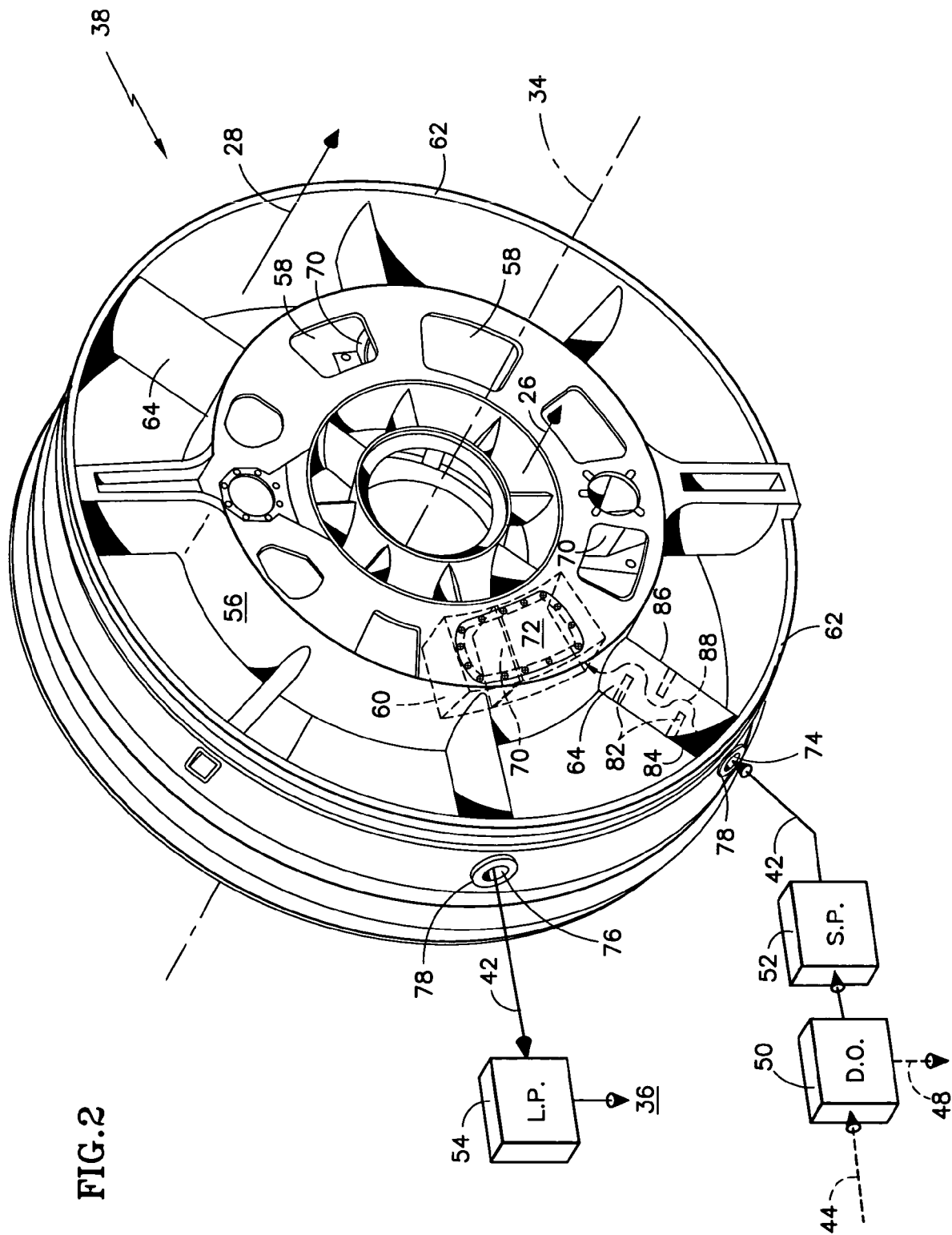
FIG. 2 is an isometric rear view of an embodiment of a structural frame of the type used in the gas turbine engine of FIG. 1.

Referring now to FIG. 2, portions of the lubrication system 40 are integrated into a structural frame 38 for improved safety, maintainability and reduced weight. A central hub 56 comprises one or more semi-annular chambers 58, with at least one chamber 58 forming a reservoir 60 for storing a fluid such as oil 42. Circumscribing the hub 56 is a rim 62, which serves as a mounting point for the gas turbine engine 10 and as a support for the bearings 36. One or more struts 64 extend radially outward from the hub 56 to the rim 62 and are circumferentially spaced from one another. Bypass air 28 from the fan stage 22 is directed between the rim 62 and the hub 56 and around the struts 64. The struts 64 may contain a passage 66 (FIGS. 3-5) for directing the oil 42 between the rim 62 and the reservoir 60 and may also contain an air/fluid heat exchanger 68 for removing heat from the oil 42. The structural frame 38 may be cast or forged as a single piece, or individual elements may be joined by welding, brazing or other suitable process. Although the fluid described in this example is oil 42, it is to be understood that other fluids used by a gas turbine engine 10 or an aircraft may similarly be stored and cooled.

The hub 56 includes a bulkhead 70, which defines a semi-annular chamber 58, forming a reservoir 60. The reservoir 60 is sized and circumferentially located to accommodate the lubrication system 40 requirements of the gas turbine engine 10. Although a single reservoir 60 is shown in the example, multiple reservoirs 60 may also be included. For example, a first reservoir 60 may store oil 42, and a second reservoir 60 may store hydraulic fluid (not shown). The bulkheads 70 may be integrally formed with the hub 56 at the time of manufacture or may be joined by welding, brazing or other suitable means. A cover 72 encloses the reservoir 60 and is fastened to the hub 56 by bolting, riveting, welding or other suitable means. The cover 72 allows access to the reservoir 60 for inspection or maintenance and also simplifies manufacturing of the hub 56.

Figure 3:
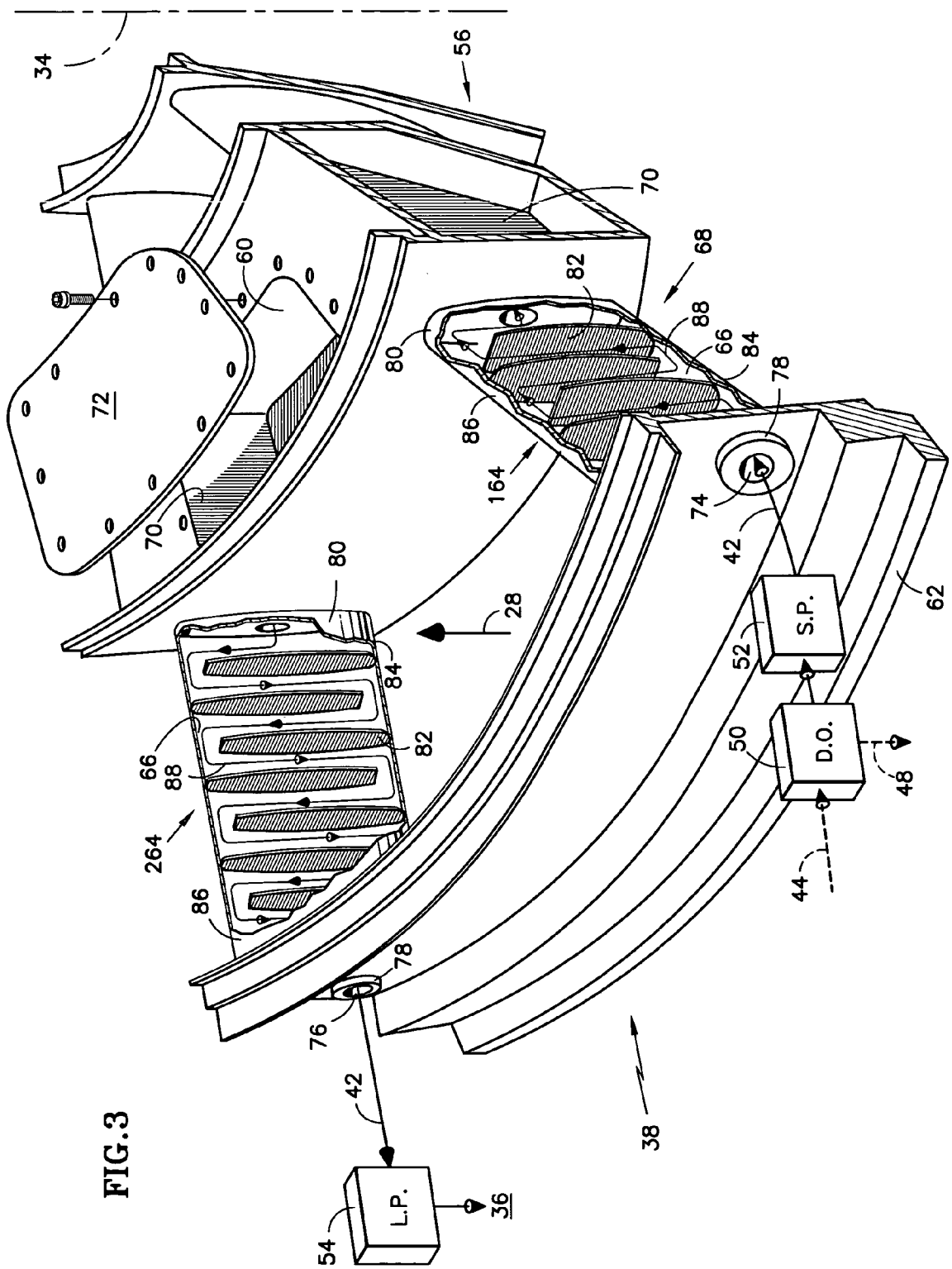
FIG. 3 is a partial sectional view of a structural frame in accordance with an embodiment of the present invention.
Figure 4:
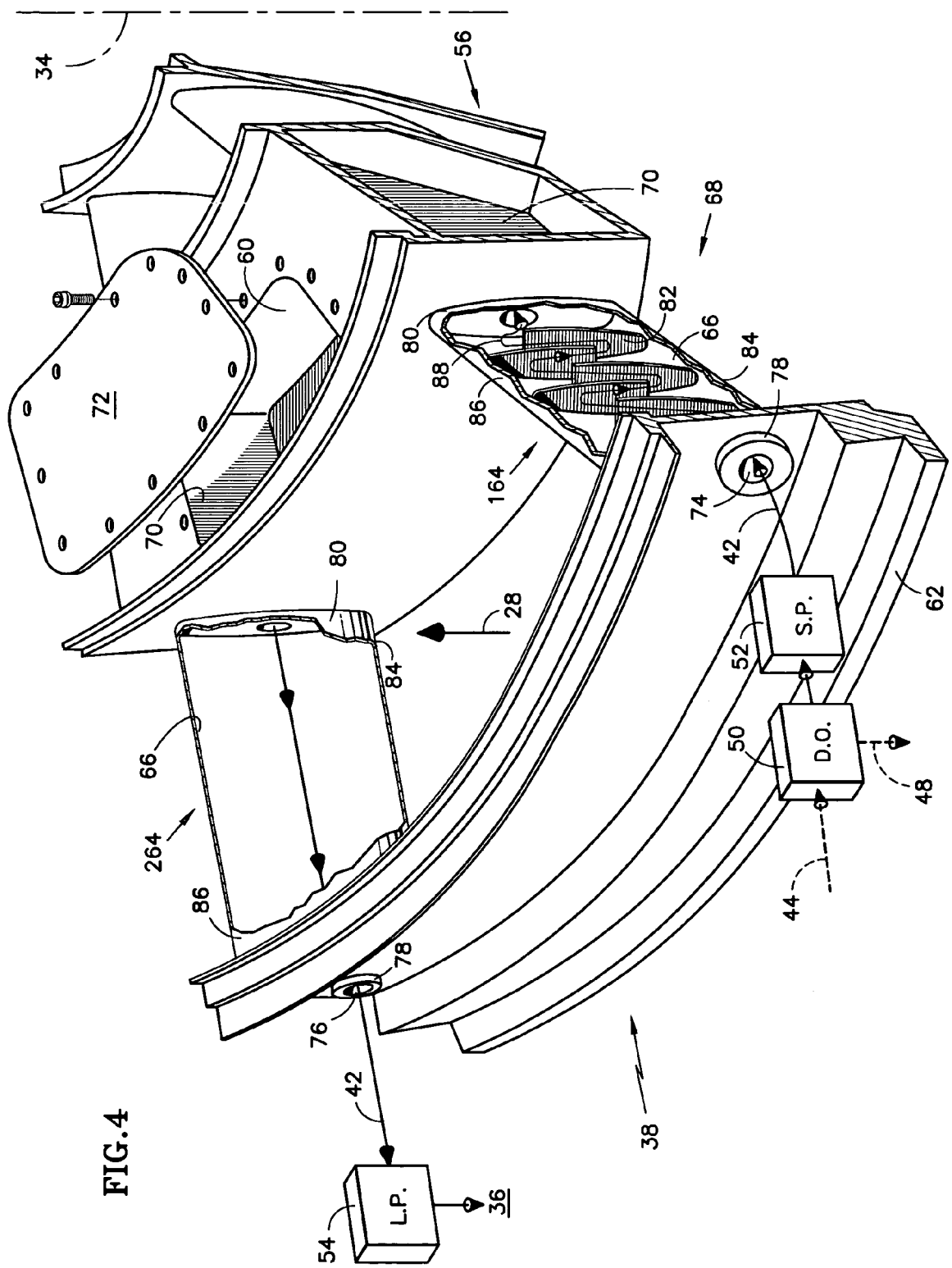
FIG. 4 is a partial sectional view of a structural frame in accordance with another embodiment of the present invention.
Figure 5:
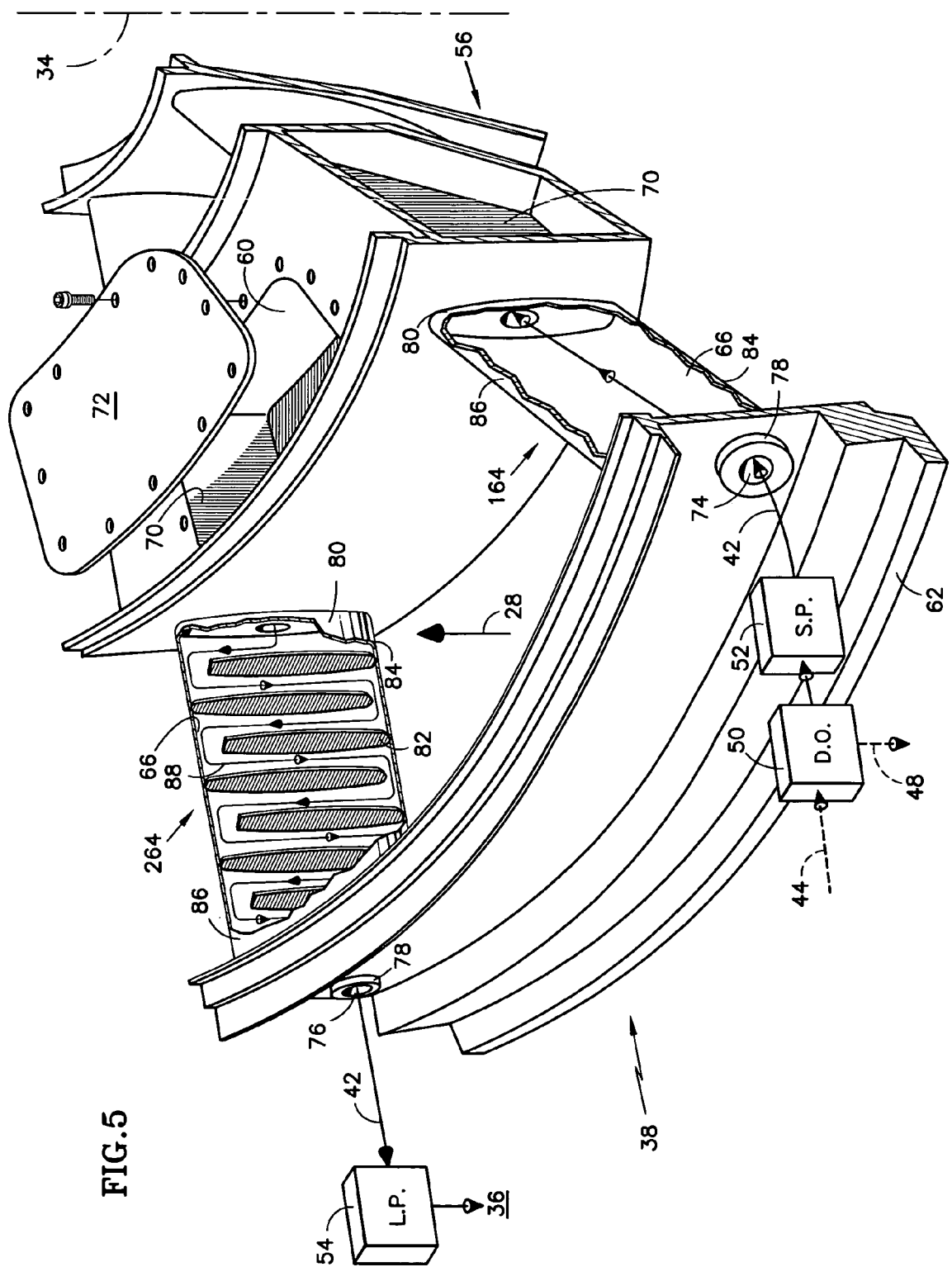
FIG. 5 is a partial sectional view of a structural frame in accordance with yet another embodiment of the present invention.
Figure 6:
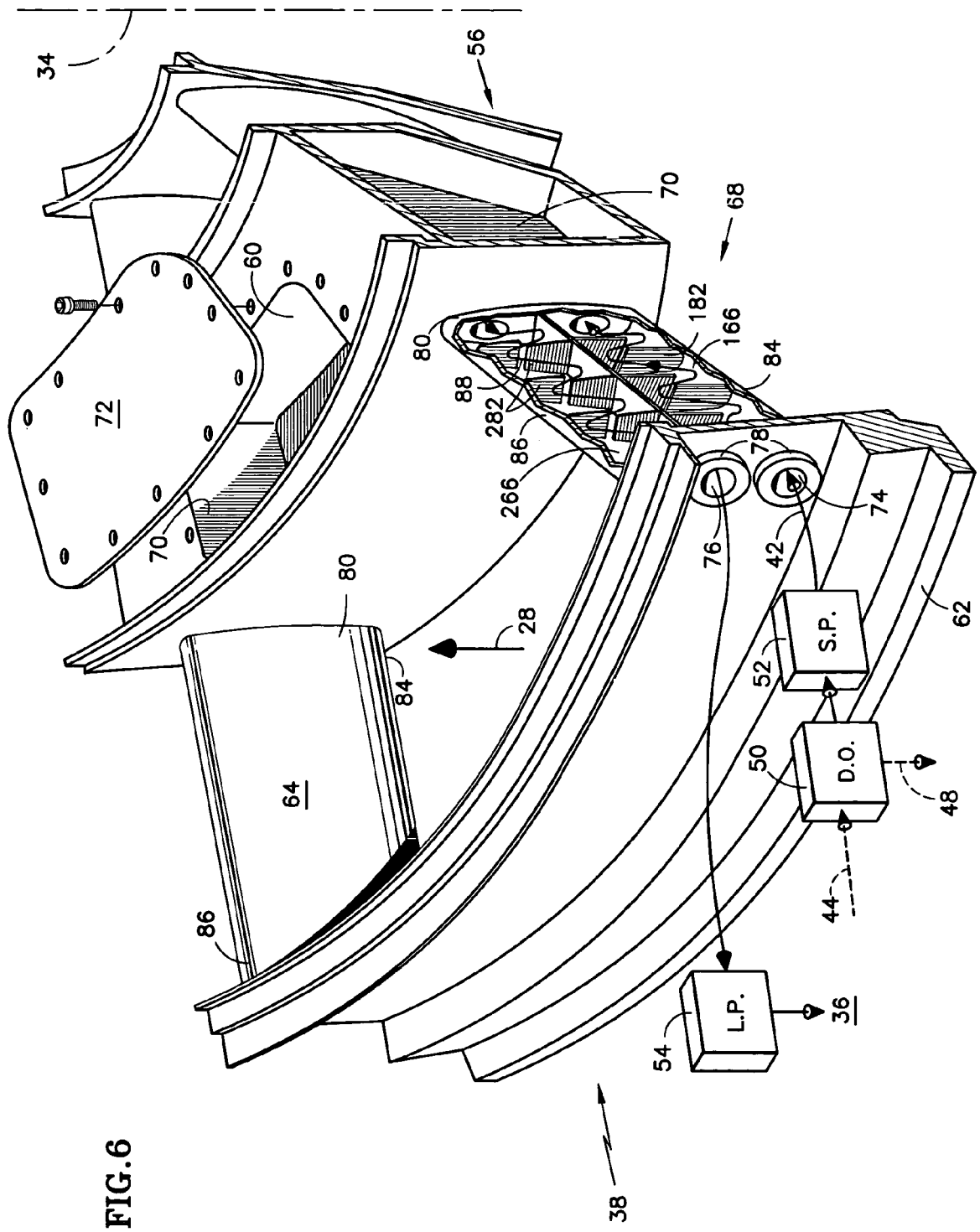
FIG. 6 is a partial sectional view of a structural frame in accordance with yet another embodiment of the present invention.

The rim 62 may include an inlet port 74 for introducing hot oil 42 into the structural frame 38 from the scavenge pump 52. The inlet port 74 is positioned circumferentially to coincide with a strut 64 and may penetrate the radial thickness of the rim 62. An outlet port 76 removes cooled oil 42 from the structural frame 38 for delivery to the lubrication pump 54. The outlet port 76 is positioned circumferentially to coincide with a strut 64 and may penetrate the radial thickness of the rim 62. The inlet 74 and outlet 76 ports may coincide with different struts 64 as is shown in FIGS. 3-5, or may coincide with a common strut 64 as shown in FIG. 6. Note that different struts 64 need not be adjacent to one another as is shown in the figures. Bosses 78 at each of the inlet 74 and outlet 76 ports provide additional material for fittings, flanges or other suitable attachment means.

The struts 64 typically have an airfoil-shaped transverse cross section and comprise an outer skin 80 that is exposed to the bypass air 28 discharged by the fan 22. As shown in FIGS. 3-5, one or more passages 66 may extend within a strut 64, for directing oil 42 to and from the reservoir 60. As shown in FIG. 6, a supply passage 166 directs oil 42 into the reservoir 60 and a discharge passage 266 directs oil 42 out of the reservoir 60. An air/fluid heat exchanger 68, for transferring heat from the oil 42 to the bypass air 28 may reside in at least one of the passages 66. The air/fluid heat exchanger 68 may also be located in portions of the hub 56 or rim 62 that are also exposed to the bypass air 28.

In accordance with an embodiment of an air/fluid heat exchanger 68 as shown in each of FIGS. 3-6, the air/fluid heat exchanger 68 is integrally formed inside a strut 64 during manufacture. The heat exchanger resides in one or more of the passages 66 that extend within the strut 64. One or more integral baffles 82 are distributed in the radial direction between the rim 62 and the hub 56 and are alternately offset in the axial direction toward the leading edge 84 and the trailing edge 86, thus forming a circuitous fluid path 88. The circuitous fluid path 88 creates turbulence and promotes heat transfer between the oil 42 and the outer skin 80.

Figure 7:
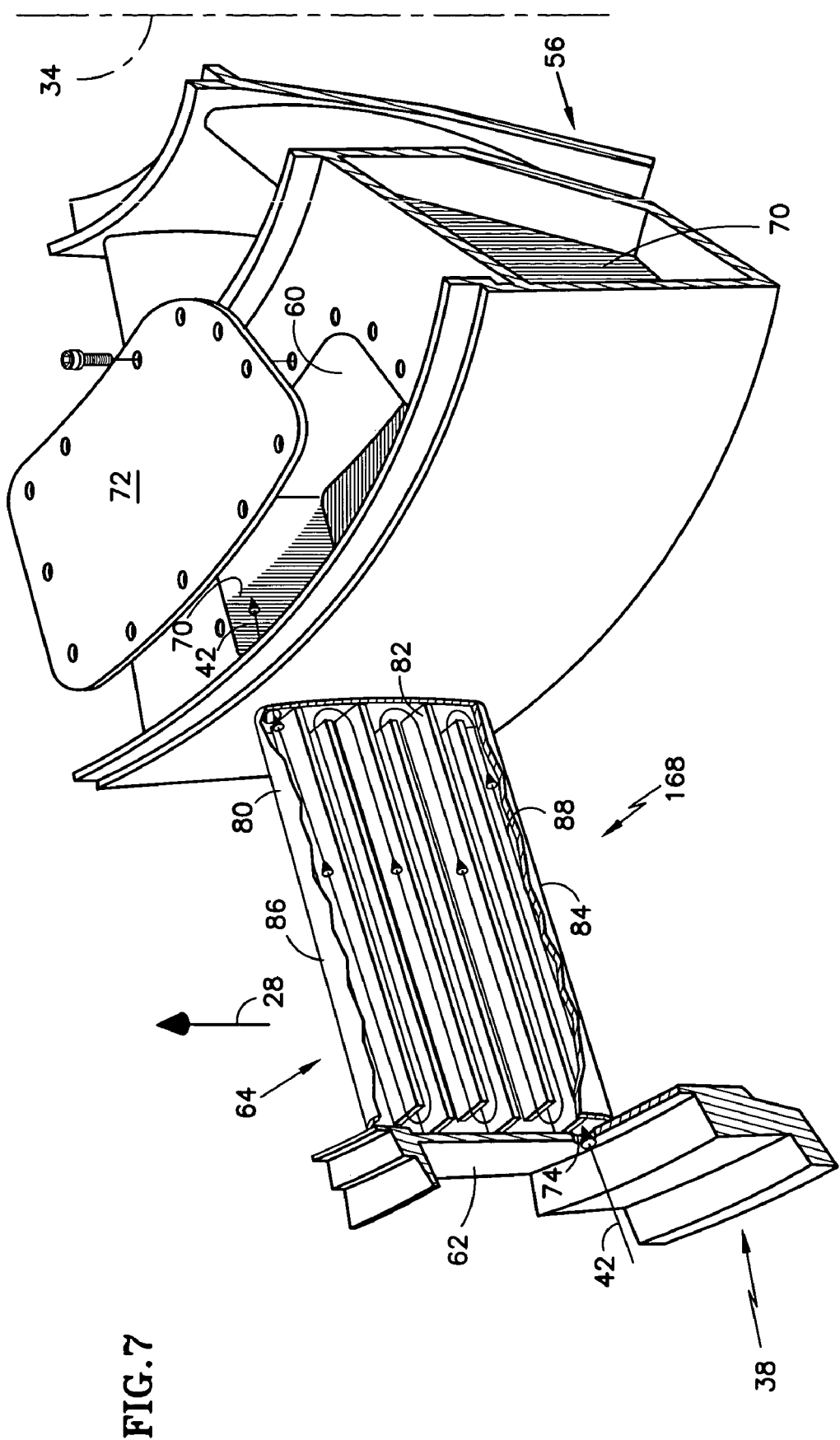
FIG. 7 is a partial sectional view in accordance with another embodiment of an air/fluid heat exchanger of the present invention.

In accordance with another embodiment of an air/fluid heat exchanger 168 as shown in FIG. 7, the air/fluid heat exchanger 68 is integrally formed inside a strut 64 during manufacture. The heat exchanger resides in one or more of the passages 66 that extend within the strut 64. One or more integral baffles 82 are distributed in the axial direction between the leading edge 84 and the trailing edge 86 and are alternately offset in the radial direction toward the rim 62 and the hub 56, thus forming a circuitous path 88. The circuitous path 88 creates turbulence and promotes heat transfer between the oil 42 and the outer skin 80.

Figure 8:
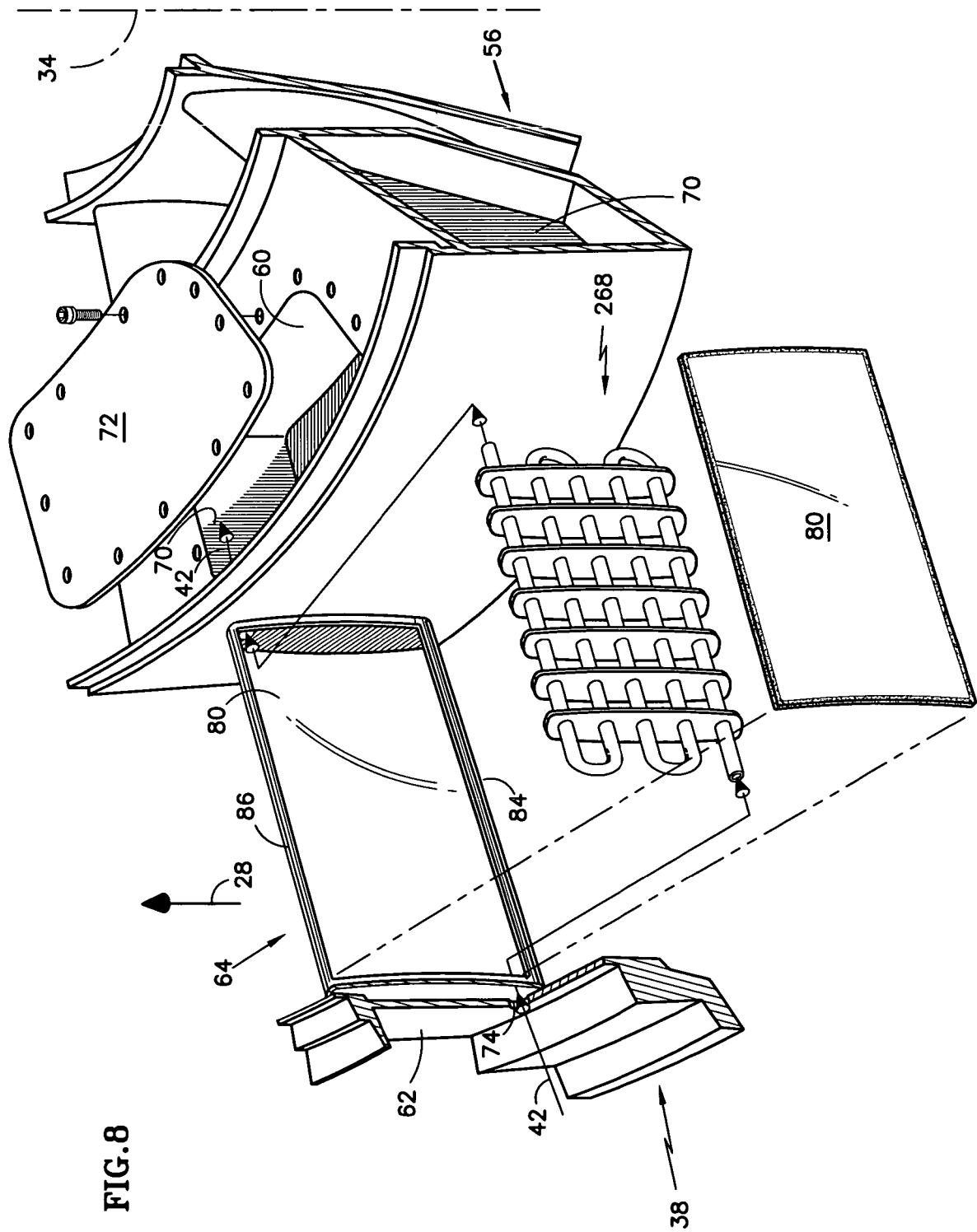
FIG. 8 is a partial, exploded sectional view in accordance with yet another embodiment of an air/fluid heat exchanger of the present invention.

In accordance with yet another embodiment of an air/fluid heat exchanger 268 as shown in FIG. 8, the air/fluid heat exchanger 68 is separately manufactured and later installed in a passage 66. Once installed in the passage 66, a portion of the outer skin 80 is joined to the strut 64 by bolting, riveting, welding, brazing or other suitable means. The embodiment of FIG. 8 may alternately be used as a fluid/fluid heat exchanger. For example, aviation fuel may surround the hot oil 42 within the passage 66, preventing ice from forming in the fuel.

In accordance with an embodiment of a structural frame 38 of FIG. 3, a scavenge pump 52 directs hot oil 42 from a deoiler 50 to an inlet port 74. The inlet port 74 penetrates a portion of a rim 62 coinciding with and fluidly coupled to a passage 66 extending radially through a first strut 164. An array of axially alternating baffles 82, integrated into the passage 66, imparts a circuitous path 88 to the oil 42. It is the simultaneous interaction of the oil 42 and bypass air 28 with the outer skin 80, which transfers heat from the oil 42 to the bypass air 28. A reservoir 60, fluidly coupled to the passage 66 of the first strut 164 and formed in a central hub 56, stores the oil 42 after heat is transferred to the bypass air 28. The oil 42 is directed from the reservoir 60 into a passage 66 of a second strut 264, also fluidly coupled to the reservoir 60. An array of axially alternating baffles 82, integrated into the passage 66, imparts a circuitous path 88 to the oil 42. It is the simultaneous interaction of the oil 42 and bypass air 28 with the outer skin 80, which transfers heat from the oil 42 to the bypass air 28. An outlet port 76 penetrates a portion of the rim 62, coinciding with and fluidly coupled to the passage 66 of the second strut 264, for discharging the oil 42 from the structural frame 38. A lubrication pump 54 directs the cooled oil 42 back to the bearings 36 to begin the lubrication process anew.

In accordance with another embodiment of a structural frame 38 of FIG. 4, a scavenge pump 52 directs hot oil 42 from a deoiler 50 to an inlet port 74. The inlet port 74 penetrates a portion of a rim 62 coinciding with and fluidly coupled to a passage 66 extending radially through a first strut 164. An array of axially alternating baffles 82, integrated into the passage 66, imparts a circuitous path 88 to the oil 42. It is the simultaneous interaction of the oil 42 and bypass air 28 with the outer skin 80, which transfers heat from the oil 42 to the bypass air 28. A reservoir 60, fluidly coupled to the passage 66 of the first strut 164 and formed in a central hub 56, stores the oil 42 after heat is transferred to the bypass air 28. The oil 42 is directed from the reservoir 60 into a passage 66 of a second strut 264, also fluidly coupled to the reservoir 60. An outlet port 76 penetrates a portion of the rim 62, coinciding with and fluidly coupled to the passage 66 of the second strut 264, for discharging the oil 42 from the structural frame 38. A lubrication pump 54 then directs the cooled oil 42 back to the bearings 36 to begin the lubrication process anew.

In accordance with yet another embodiment of a structural frame 38 of FIG. 5, a scavenge pump 52 directs hot oil 42 from a deoiler 50 to an inlet port 74. The inlet port 74 penetrates a portion of a rim 62 coinciding with and fluidly coupled to a passage 66 extending radially through a first strut 164. A reservoir 60, fluidly coupled to the passage 66 of the first strut 164 and formed in a central hub 56, stores the oil 42. The oil 42 is directed from the reservoir 60 into a passage 66 of a second strut 264, also fluidly coupled to the reservoir 60. An array of axially alternating baffles 82, integrated into the passage 66, imparts a circuitous path 88 to the oil 42. It is the simultaneous interaction of the oil 42 and bypass air 28 with the outer skin 80, which transfers heat from the oil 42 to the bypass air 28. An outlet port 76 penetrates a portion of the rim 62, coinciding with and fluidly coupled to the passage 66 of the second strut 264, for discharging the oil 42 from the structural frame 38. A lubrication pump 54 then directs the cooled oil 42 back to the bearings 36 to begin the lubrication process anew.

In accordance with yet another embodiment of a structural frame 38 of FIG. 6, a scavenge pump 52 directs hot oil 42 from a deoiler 50 to an inlet port 74. The inlet port 74 penetrates a portion of a rim 62 coinciding with and fluidly coupled to a supply passage 166 extending radially through a strut 64. A first array of axially alternating baffles 182, integrated into the supply passage 166 of the strut 64, imparts a circuitous path 88 to the oil 42. It is the simultaneous interaction of the oil 42 and bypass air 28 with the outer skin 80, which transfers heat from the oil 42 to the bypass air 28. A reservoir 60, fluidly coupled to the supply passage 166 and formed in a central hub 56, stores the oil 42. The oil 42 is directed from the reservoir 60 into a discharge passage 266 extending radially through the strut 64 and also fluidly coupled to the reservoir 60. A second array of axially alternating baffles 282, integrated into the discharge passage 266, imparts a circuitous path 88 to the oil 42. It is the simultaneous interaction of the oil 42 and bypass air 28 with the outer skin 80, which transfers heat from the oil 42 to the bypass air 28. An outlet port 76 penetrates a portion of the rim 62, coinciding with and fluidly coupled to the discharge passage 266, for discharging the oil 42 from the structural frame 38. A lubrication pump 54 then directs the cooled oil 42 back to the bearings 36 to begin the lubrication process anew.

While the present invention has been described in the context of several embodiments thereof, other alternatives, modifications and variations will become apparent to those skilled in the art having read the foregoing description. Accordingly, it is intended to embrace those alternatives, modifications and variations as fall within the broad scope of the appended claims.

What is claimed is:

1. In a gas turbine engine, a frame comprising:
a central hub, said hub forming a reservoir for storing a fluid;
an outer rim, said rim circumscribing said hub;
at least one heat exchanger, wherein said at least one heat exchanger is fluidly coupled to the reservoir and is in simultaneous communication with the fluid and an air stream; and
one or more struts spanning radially between said hub and said rim, said one or more struts containing a leading edge and a trailing edge and wherein at least one of the struts includes at least one heat exchanger.

2. The frame of claim 1, wherein only one of the struts includes at least one heat exchanger.

3. The frame of claim 1, wherein each of the struts that includes a heat exchanger includes exactly one heat exchanger.

4. The frame of claim 1, wherein one of the struts includes a supply passage for introducing the fluid into the reservoir and another one of the struts includes a discharge passage for expelling the fluid from the reservoir.

5. The frame of claim 1, wherein at least one of the struts that include at least one heat exchanger includes a supply passage for introducing the fluid into the reservoir, a discharge passage for expelling the fluid from the reservoir and wherein at least one of the passages extends through the at least one heat exchanger.

6. The frame of claim 5, wherein only the supply passage extends through the at least one heat exchanger.

7. The frame of claim 5, wherein only the discharge passage extends through the at least one heat exchanger.

8. The structural frame of claim 5, wherein the at least one heat exchanger comprises an array of baffles, the baffles being integrally formed with the at least one of the struts.

9. The structural frame of claim 8, wherein the baffles are arranged to impart a circuitous fluid path to the at least one of the passages.

10. The structural frame of claim 9, wherein the baffles are distributed, between said rim and said hub and are alternately offset toward the leading edge and the trailing edge.

11. The structural frame of claim 9, wherein the baffles are distributed between the leading edge and trailing edge and are alternately offset toward said rim and said hub.

12. The structural frame of claim 1, wherein the one or more struts further comprises an airfoil-shaped transverse cross section.

13. The structural frame of claim 5, further comprising an inlet port in said rim for introducing fluid into the frame, wherein the inlet port penetrates the radial thickness of said rim and is fluidly coupled to the supply passage.

14. The structural frame of claim 13, further comprising an outlet port in said rim for discharging fluid from the frame, wherein the outlet port penetrates the radial thickness of said rim and is fluidly coupled to the discharge passage.

* * * * *